Patented Oct. 1, 1940

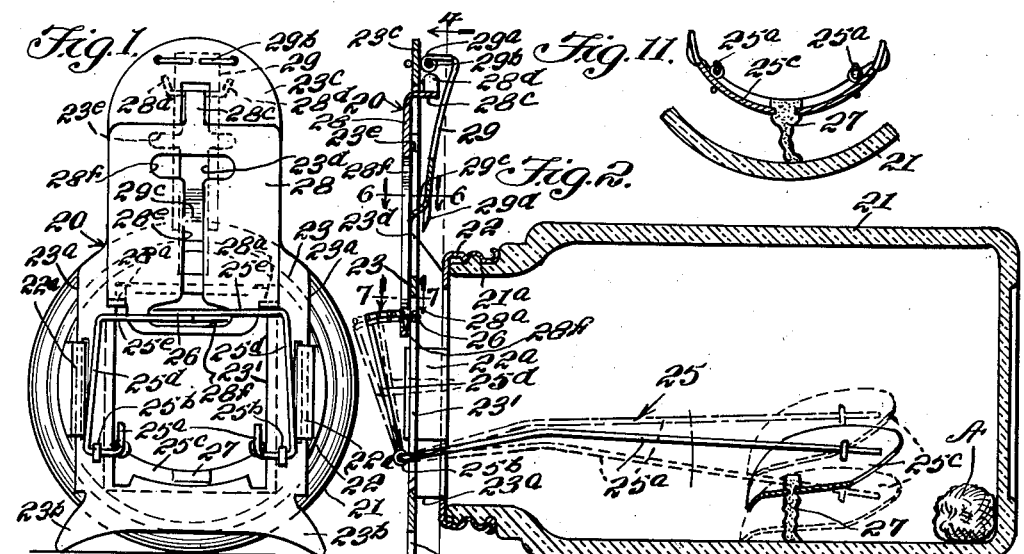

2,216,644

UNITED STATES PATENT OFFICE 2,216,644

MOUSE TRAP

Frank Heldman, Spring Valley, N. Y.

Application September 15, 1939, Serial No. 295,138

4 Claims. (Cl. 43—61)

This invention relates to improvements especially in traps for small animals of the type in which the animal is captured but not necessarily killed.

It is among the objects of this invention to provide a novel small animal trap which can conveniently be set merely by inverting the same and which includes no spring pressed members, but the parts of which operate by means including the action of gravity.

Another object of this invention is to provide a trap wherein gravity-sensitive means are released by movements of an animal within a chamber causing the chamber to be closed and the animal to be trapped.

Still another object of this invention is to provide an animal trap of the type above mentioned which includes an automatically functioning locking device precluding egress of the animal from the trap after the trap has been sprung.

A feature of the novel trap according to the present invention is that if, because of some circumstance, the door is not completely closed to locked position, means are provided for inhibiting raising of the door by the animal past a certain point whereby escape of the animal is prevented.

An advantage of this type of animal trap over other types of animal traps now commonly in use is that in the setting of the trap it is not necessary for the operator to handle any parts of the trap with which the animal comes or has come in contact.

Another advantage of the novel trap according to this invention over other traps now in use is its simplicity in construction and freedom from spring pressed parts, the former assuring minimum cost of manufacture through utilization of the advantages of mass production, and the latter assuring long useful life without need for repair.

Other objects, advantages and features of the new and improved animal trap according to the present invention will be apparent to those skilled in this art during the course of the following description.

Regarded in certain of its broader aspects the novel animal trap according to the present invention comprises in combination with a chamber, a treadle positioned in the chamber normally yieldingly supported in raised position and a vertically freely slidingly mounted door for closing the chamber, the treadle being operatively connected to a latch normally restrictively controlling motion of the door, operation of the latch being initiated and controlled by movement of the treadle from normal position.

In order to facilitate a fuller and more complete understanding of the present invention a specific embodiment thereof herein illustrated will be hereinafter described, it being clearly understood, however, that the illustrated embodiment, although presently preferred, is provided solely by way of example of the practice of this invention and not by way of limitation thereof except insofar as the invention is recited in the subjoined claims.

Referring then to the drawing,

Figure 1 is substantially a front elevational view of the presently preferred embodiment of this invention, Fig. 2 is a vertical sectional view of Fig. 1, Fig. 3 is a horizontal sectional view of Fig. 1, Fig. 4 is substantially a vertical sectional view of Fig. 2 taken along the line 4—4 thereof, Fig. 5 is a vertical sectional view of a portion of the device illustrated in Fig. 2 showing the trap door in closed position, Fig. 6 is essentially a horizontal sectional view of Fig. 2 taken along the line 6—6 thereof, Fig. 7 is a horizontal sectional view of Fig. 2 taken along the line 7—7 thereof, Fig. 8 is a vertical sectional view of a portion of the trap mechanism showing the door in locked position, Fig. 9 is substantially a horizontal sectional view of Fig. 8 taken along the line 9—9 thereof, Fig. 10 is essentially a horizontal sectional view of Fig. 8 taken along the line 10—10 thereof, and Fig. 11 is a vertical sectional view of Fig. 3 taken along the line 11—11 thereof.

Referring now to the drawing, it will be noted that the animal trap generally designated by the numeral 20 comprises a chamber 21 which, in this instance, is a conventional jar with a threaded neck 21a for receiving a cap member 22 substantially as shown. The cap 22 is in substance an annulus inasmuch as the central portion thereof is cutaway to provide an opening to the chamber, side portions 22a of the opening being bent outwardly to pass through openings formed in the standard plate 23, as is best shown in Figs. 1, 3 and 4. Edge portions 23a of the plate 23 are bent to provide flanges for holding the plate in spaced relationship to the cap member 22. An opening 23' rectangular in outline is provided in the plate 23 located near the center of the cap member 22 thereby defining the entrance to the chamber 21. It is to be noted that claws or feet 23b are provided on the base of the plate 23 to prevent rolling of the trap upon the curved sides of the chamber 21 and it further is to be noted that the top part 23c of the plate 23 extends upwardly above the level of the chamber 21 as will be perceived in Figs. 1, 2 and 4. A vertically extending slot 23d is formed in the upper part 23c of the plate 23 and communicates at its lower end with the rectangular opening 23' above mentioned. The transversely extending slot 23e intersects the vertical slot 23d and in cooperation with other parts of the device performs functions hereinafter to be described.

A treadle generally designated by the numeral 25 comprising spaced essentially parallel supporting arms 25a pivotally mounted in bearing elements 25b attached to parts of the plate 23 near the bottom of the opening 23' therein is positioned within the chamber 21 and is provided with a treadle plate 25c mounted on end parts of the arms 25a substantially as is shown in Figs. 2 and 3. It is to be observed that the arms 25a are formed of wire or the like and passing through the bearing elements 25b continue as the elements 25d and 25e around the sides and top of the opening 23' formed in the plate 23, terminating in the essentially horizontally positioned T-shaped latch element 26. The treadle 25 normally is yieldingly held in raised position by a support 27 formed of intrinsically resilient material such as rubber or the like. In Fig. 2 other than normal positions of the treadle are illustrated in phantom view from which it will be apparent that movement of the treadle from a normal raised position causes horizontal oscillation of the T-shaped latch element 26.

A freely vertically sliding door 28 connected to the plate 23 by lugs 28a embracing sides of the opening 23' and by the lug 28c extending through the vertically positioned slot 23d is movable in position obstructing the entrance opening 23' of the chamber 21 and upon occasion also is movable vertically into nonobstructing position. Ears 28d formed integrally with end portions of the lug 28c serve to prevent accidental movement of the lug 28c from the opening 23d, it being obvious of course that inasmuch as the ears 28d are up-turned, the end portion of the lug 28c may not pass through the horizontally extending slot 23e.

A vertically extending I-shaped opening comprising a vertically positioned slot 28e terminating in horizontally positioned slots 28f is formed in the door 28, the slots being located centrally in the door whereby the horizontally extending branches of the T-shaped latch element 26 are positionable within the horizontally extending slots 28f and the central portion of the T-shaped latch element is positionable within the vertically extending slot 28e. It is to be understood that when the treadle 25 is in normal position, essentially as shown in full line in Fig. 2, the T-shaped latch element engages with one of the slots 28f, but when the treadle is moved from normal position, the element is disengaged therefrom.

A downwardly dependent freely swinging arm 29 mounted by an integrally formed hinge element 29a on the horizontally extending support 29b attached to the upper part 23c of the plate 23 is provided at its lower distal end with a locking tongue 29c positionable within the vertically extending slot 23d formed in the plate 23 and engageable with parts of the sliding door 28 as hereinafter will be described. Angularly downwardly extending bifurcated wedge elements 29d also are provided on the lower distal end of the arm 29 for engagement with ears 28d carried on the lug 28c as subsequently will be described.

Having described the structural elements of the novel trap according to this invention, its operation now will be described wherein again reference will be made to the accompanying drawing and to the parts therein designated by reference characters. The trap is set by inverting the same from the position shown in Fig. 2. When inverted, the treadle 25 moves the T-shaped latch element 26 from engagement with the sliding door 28 permitting the door to slide into opened position. As the trap is moved into normal position, the treadle moves downwardly resting upon the support 27 and the T-shaped latch element 26 is moved into engagement with the lowermost horizontal slot 28f formed in the door 28, thereby holding the door in raised open position. When so manipulated, the tongue 29c of the arm 29 rests against the rear of the plate 28. As the animal to be trapped moves within the chamber 21 toward the bait A therein positioned, the animal moves the treadle 25 from normal position whereby the T-shaped latch element 26 is moved out of engagement with the lowermost horizontally extending slot 28f permitting the door 28 to fall by action of gravity on the same. As the door falls, the lug 28c strikes the tongue 29c throwing the arm 29 backwardly and on the return swing of the arm the tongue 29d overlies the lug 28c substantially as shown in Fig. 5. It will be evident that with the elements so positioned, return movement or raising of the door 28 will be prevented by the tongue 29c positioned within the slot 23d engageable with the lug 28c. Forcing the door 28 upwardly causes the wedge elements 29d to position themselves between the rear surface of the plate 23 and the tongues 28d, thereby locking the door against further movement.

Assuming that due to some circumstances the door 28 does not fall to the completely lowered position illustrated in Figs. 5, 8 and 9 whereby the lug 28c has not passed the tongue 29c, it will be evident that upward motion of the door will be substantially uninhibited. However, under these circumstances, unless the door is moved upwardly in a manner such as to prevent the lug 28c from riding on one of the sides of the slot 23d, the lug 28c will move into the transversely extending slot 23e, thereby preventing further motion of the door, either upwardly or downwardly.

It is to be understood of course that this invention is capable of extended application and is not confined to the precise illustrated forms nor described construction and, therefore, such changes and modifications may be made therein as do not affect the spirit of the invention nor exceed the scope of the appended claims.

Having thus described the present invention, what it is desired to secure by Letters Patent is:

1. An animal trap comprising a chamber; a treadle within said chamber; means for normally yieldingly holding said treadle in raised position; a freely vertically slidingly mounted door for said chamber having slots formed therein; and a moving member, connected to and operated by said treadle, disposed whereby said member is positioned within said slots when the treadle is in normal position preventing vertical motion of the door.

2. An animal trap comprising a chamber; a treadle within said chamber; means for normally yieldingly holding said treadle in raised position; a freely vertically slidingly mounted door for said chamber having a vertically extending slot terminating in horizontally extending slots formed therein; and a moving T-shaped member, connected to and operated by said treadle, disposed whereby the transverse arms of said member are positioned within one of said horizontal slots when the treadle is in normal position preventing vertical motion of the door, but when the treadle is in other than normal position the longitudinal arm of said member is positioned in the vertically extending slot in said door.

3. An animal trap comprising a chamber; a treadle within said chamber; means for normally yieldingly holding said treadle in raised position; a freely vertically slidingly mounted door for said chamber having slots formed therein; a moving member, connected to and operated by said treadle, disposed whereby said member is positioned within said slots when the treadle is in normal position preventing vertical motion of the door; and a downwardly freely pendant latch element mounted above said door, resting against the door when open but moving into overlying obstructing position when the door is closed.

4. An animal trap comprising a chamber; a treadle within said chamber; means for normally yieldingly holding said treadle in raised position comprising an intrinsically resilient member mounted on the bottom of said treadle resting on the floor of said chamber; a gravity-sensitive freely vertically slidingly mounted door for said chamber having a vertically extending slot terminating in horizontally extending slots formed therein; a moving T-shaped member, connected to and operated by said treadle, disposed whereby the transverse arms of said member are positioned within one of said horizontal slots when the treadle is in normal position preventing vertical motion of the door, but when the treadle is in other than normal position the longitudinal arm of said member is positioned in the vertically extending slot in said door; a downwardly freely pendant latch element mounted above said door, resting against the door when open but moving into overlying obstructing position when the door is closed; and downwardly extending wedge elements carried on said latch element for engaging with and locking said door, if moved upwardly from closed position.

FRANK HELDMAN.